United States Patent
Cheng et al.

(10) Patent No.: US 10,895,933 B2
(45) Date of Patent: Jan. 19, 2021

(54) TIMING CONTROL CIRCUIT AND OPERATION METHOD THEREOF

(71) Applicant: Novatek Microelectronics Corp., Hsinchu (TW)

(72) Inventors: Huan-Teng Cheng, Hsinchu (TW); Huang-Chin Tang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/352,844

(22) Filed: Mar. 14, 2019

(65) Prior Publication Data

US 2020/0293143 A1 Sep. 17, 2020

(51) Int. Cl.
*G06F 3/041* (2006.01)
*G09G 3/20* (2006.01)

(52) U.S. Cl.
CPC .......... *G06F 3/0418* (2013.01); *G06F 3/0412* (2013.01); *G09G 3/20* (2013.01); *G09G 2310/08* (2013.01)

(58) Field of Classification Search
CPC ........... G06F 3/043; G06F 3/0412; G06F 3/20
USPC .................................................. 345/173, 174
See application file for complete search history.

(56) References Cited

U.S. PATENT DOCUMENTS

| | | | | |
|---|---|---|---|---|
| 9,164,610 B2* | 10/2015 | Ahn | ..................... | G09G 3/3225 |
| 9,377,882 B2* | 6/2016 | Kim | ..................... | G02F 1/13338 |
| 2013/0050146 A1* | 2/2013 | Saitoh | ................... | G06F 1/3265 |
| | | | | 345/174 |
| 2015/0123963 A1* | 5/2015 | Tsai | ..................... | G09G 3/2096 |
| | | | | 345/213 |
| 2017/0153736 A1* | 6/2017 | Kim | ..................... | G06F 3/0416 |

* cited by examiner

*Primary Examiner* — Calvin C Ma
(74) *Attorney, Agent, or Firm* — JCIPRNET

(57) ABSTRACT

A timing control circuit and an operation method thereof are provided. The timing control circuit includes a receiving circuit, a line memory, and a timing generating circuit. The receiving circuit receives a video packet stream from the outside and provides an external horizontal sync signal and a first data signal. The line memory temporarily stores the first data signal, and outputs a second data signal to a source driver according to an internal horizontal sync signal generated by the timing generating circuit. A video frame period of the second data signal includes a video display operation period and a touch detection period. A video display operation period is divided into a plurality of sub-periods. The timing generating circuit performs a synchronization operation in each of the sub-periods, so as to synchronize the timing of the internal horizontal sync signal with the timing of the external horizontal sync signal.

16 Claims, 3 Drawing Sheets

TIMING CONTROL CIRCUIT AND OPERATION METHOD THEREOF

BACKGROUND

Field of the Invention

The invention relates to a touch display apparatus and more particularly, to a timing control circuit and an operation method thereof.

Description of Related Art

A touch display panel is a kind of display panel with a video display function and a touch detecting function. Namely, the touch display panel is formed by embedding at least one touch sensor inside the display panel. A touch with display driver integration (TDDI) chip is capable of driving the touch display panel. Generally speaking, the TDDI chip may receive a video packet stream from a front stage circuit (e.g., a processor, etc.) via a mobile industry processor interface (MIPI). The TDDI chip may drive data lines (or referred to as source lines) and scan lines (or referred to as gate lines) of the touch display panel according to the video packet stream, such that the touch display panel may display video frames. Moreover, the TDDI chip may sense/detect a touch event occurring to the touch display panel via the touch display panel.

In order to prevent noise generated by a touch sensing operation from interfering a video display operation, the TDDI chip may perform a "long H (also known as H-blank in other literature)" mode to time-divisionally perform the touch sensing operation and the video display operation. The "long H" mode is a common skill known to the touch display panel technical field and will not be repeatedly described. In the "long H" mode, the TDDI chip may pause the video display operation for performing the touch sensing operation per a time of a fixed number of scan lines. In any way, "pausing the video display operation" may cause a certain one of the scan lines and a gate driver on array (GOA) thereof to be driven for a long time (in comparison with the other scan lines). The scan line being driven for a long time means that long H stripes (also known as horizontal gate line stripes) which are unrecoverable may be incurred to such scan line after long operating time (or a long-term reliability experiment).

In order to prevent the unrecoverable long H stripes from being incurred in the "long H" mode, the TDDI chip may enter a power-saving doze mode (also known as doze mode, followed by "doze mode"). In a state of the doze mode, the TDDI chip performs the touch sensing operation only when the video display operation of a complete frame is completed. The doze mode is similar to the traditional display scan method. There is no pause time for long H, but all gate lines are scanned once, and then touch sensing is performed. In the doze mode, driving times of all the scan lines of the touch display panel are not much different from one another. Thus, the doze mode can mitigate an effect that a certain scan line is aged due to the "long H" mode. In any case, in order to insert a touch detection period for performing the touch sensing operation in a video frame period, the TDDI chip uses an internal sync signal for performing the video display operation and the touch sensing operation. The internal sync signal is different from an external sync signal of the video packet stream of the MIPI, such that the touch detection period is inserted in a video frame period.

Generally, the TDDI chip generates the internal sync signal according to an internal clock signal provided by an oscillator circuit (OSC). The TDDI chip, in a conventional doze mode, performs a synchronization operation on the internal sync signal for once only after the video display operation of a complete frame is finished, so as to synchronize a timing of the internal sync signal with a timing of the external sync signal. Nevertheless, a frequency of the internal clock signal provided by the OSC may drift due to a temperature change. When the frequency of the internal clock signal drifts, the TDDI chip, in the conventional doze mode, accumulates a drift amount of the frequency of the internal clock signal because the synchronization operation is performed on the internal sync signal and the external sync signal for once only after the video display operation of a complete frame is finished. Thus, when the frequency of the internal clock signal becomes faster, a reading speed at which a data signal is read from a line memory is faster than a writing speed at which the data signal from the MIPI is written into the line memory, which results in a "(tearing effect)" issue.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides a timing control circuit and an operation method thereof for preventing a drift amount of a frequency of an internal horizontal sync signal from being accumulated.

According to an embodiment of the invention, a timing control circuit is provided. The timing control circuit includes a receiving circuit, a line memory and a timing generating circuit. The receiving circuit is configured to receive a video packet stream from the outside. The receiving circuit provides an external vertical sync signal, an external horizontal sync signal and a first data signal according to the video packet stream. The line memory is coupled to the receiving circuit to temporarily store the first data signal. The line memory is configured to output a second data signal to a source driver according to an internal vertical sync signal and the internal horizontal sync signal, so as to drive at least one data line of the touch display panel. A video frame period of the second data signal includes a video display operation period and a touch detection period, and the video display operation period is divided into a plurality of sub-periods. The timing generating circuit is coupled to the receiving circuit to receive the external vertical sync signal and the external horizontal sync signal. The timing generating circuit is configured to generate the internal vertical sync signal and the internal horizontal sync signal to the line memory. The timing generating circuit perform a synchronization operation during each of the sub-periods, so as to synchronize a timing internal horizontal sync signal with a timing of the external horizontal sync signal.

According to an embodiment of the invention, an operation method of a timing control circuit is provided. The operation method includes: receiving a video packet stream from the outside of the timing control circuit by a receiving circuit; providing an external vertical sync signal, an external horizontal sync signal and a first data signal according to the video packet stream by the receiving circuit; temporarily storing the first data signal by a line memory; outputting a second data signal to a source driver according to an internal vertical sync signal and an internal horizontal sync signal by the line memory, so as to drive at least one data line of the touch display panel, wherein a video frame period of the second data signal includes a video display operation period, and the video display operation period is divided into a plurality of sub-periods; generating the internal vertical sync signal and the internal horizontal sync signal to the line memory by a timing generating circuit; and performing a synchronization operation during each of the sub-periods by the timing generating circuit, so as to synchronize a timing of the internal horizontal sync signal with a timing of the external horizontal sync signal.

Based on the above, with the timing control circuit and the operation method thereof provided by the embodiments of the invention, the video display operation period of a video frame period can be divided into a plurality of sub-periods. The timing generating circuit can perform the synchronization operation (i.e., synchronize the timing of the internal horizontal sync signal with the timing of the external horizontal sync signal) for once during each of the sub-periods. By adding a plurality of sync points in a video display operation period, the timing control circuit can prevent the drift amount of the frequency of the internal horizontal sync signal from being accumulated.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
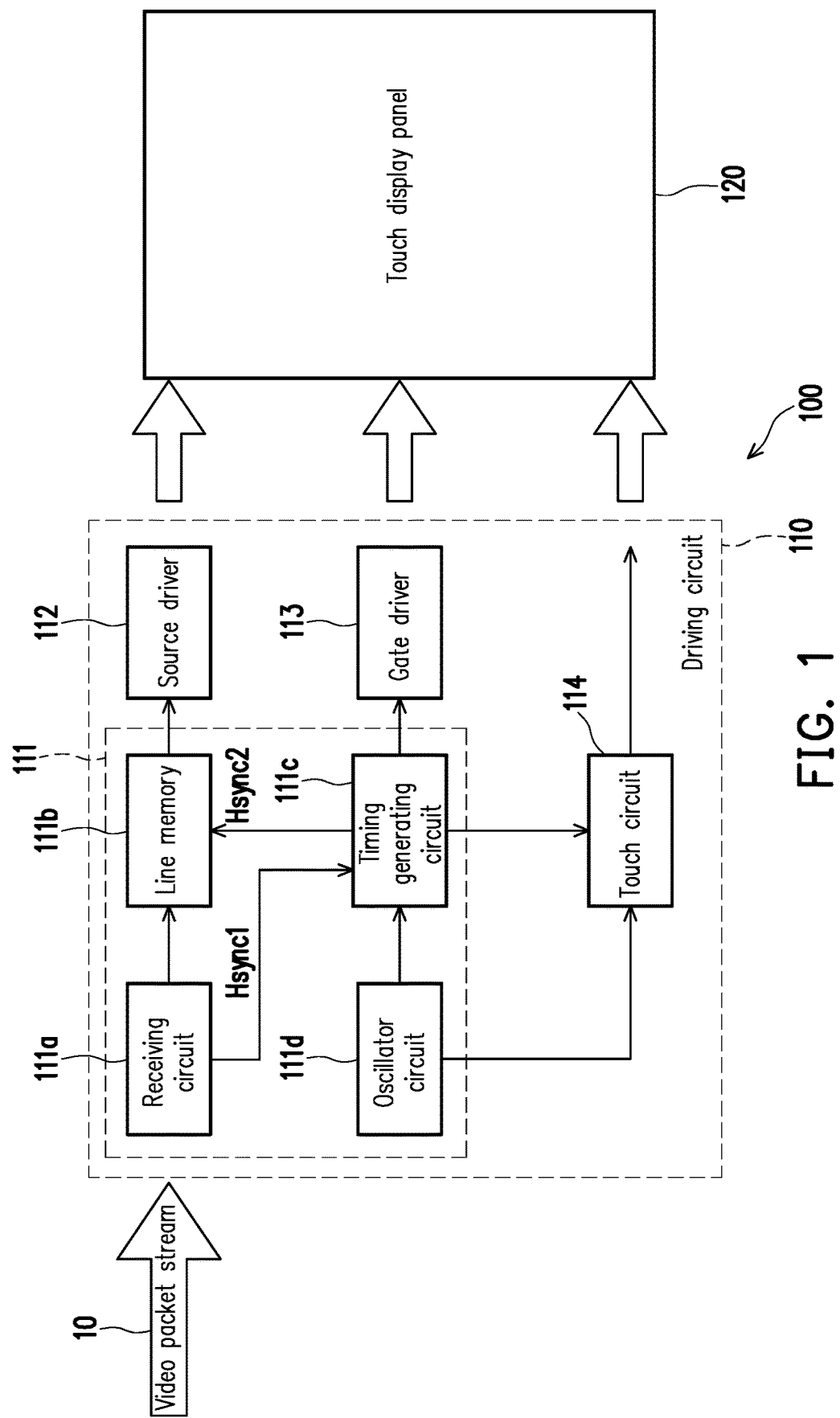
FIG. 1 is a schematic circuit block diagram illustrating a touch display apparatus according to an embodiment of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. The terms "first" and "second" mentioned in the full text of the specification (including the claims) are used to name the elements, or for distinguishing different embodiments or scopes, instead of restricting the upper limit or the lower limit of the numbers of the elements, nor limiting the order of the elements. Moreover, wherever possible, components/members/steps using the same referral numerals in the drawings and description refer to the same or like parts. Components/members/steps using the same referral numerals or using the same terms in different embodiments may cross-refer related descriptions.

FIG. 1 is a schematic circuit block diagram illustrating a touch display apparatus 100 according to an embodiment of the invention. The touch display apparatus 100 includes a driving circuit 110 and a touch display panel 120. The touch display panel 120 is a kind of video display panel with a video display function and a touch sensing function. Namely, the touch display panel 120 is formed by embedding at least one touch sensor inside the display panel. The implementation manner of the touch display panel 120 is not limited in the present embodiment.

The driving circuit 110 may receive a video packet stream 10 from a front stage circuit (which is not shown and is, for example, a processor, etc.) via the transmission interface. According to a design requirement, the transmission interface may include a mobile industry processor interface (MIPI) and/or other transmission interfaces. The driving circuit 110 may drive the touch display panel 120. According to a design requirement, the driving circuit 110 may include a touch with display driver integration (TDDI) chip and/or other driving circuits. The driving circuit 110 may drive data lines (or referred to as source lines which are not shown) and scan lines (or referred to as gate lines, which are not shown) of the touch display panel 120 according to the video packet stream 10, such that the touch display panel 120 displays video frames. Moreover, the driving circuit 110 may sense/detect a touch event occurring to the touch display panel 120 via the touch display panel 120.

In the embodiment illustrated in FIG. 1, the driving circuit 110 includes a timing control circuit 111, a source driver 112, a gate driver 113 and a touch circuit 114. The timing control circuit 111 receives the video packet stream 10 from the outside and provides a vertical sync signal, a horizontal start signal and a data signal to the source driver 112 according to the video packet stream 10. Based on the control of the timing control circuit 111, the source driver 112 may drive at least one of the data lines (not shown) of the drive touch display panel 120. The timing control circuit 111 may further provide a vertical start signal and a gate clock signal to the gate driver 113 according to the video packet stream 10. Based on the control of the timing control circuit 111, the gate driver 113 may drive at least one of the scan lines (not shown) of the touch display panel 120. The timing control circuit 111 may also control the touch circuit 114. Based on the control of the timing control circuit 111, the touch circuit 114 may provide a driving signal to at least one transmission line (i.e., a TX line, which is not shown) for driving the touch display panel 120, so as to drive the at least one touch sensor of the touch display panel 120.

In the embodiment illustrated in FIG. 1, the timing control circuit 111 includes a receiving circuit 111a, a line memory 111b, a timing generating circuit 111c and an oscillator circuit 111d. The oscillator circuit 111d provides an internal clock signal to the timing generating circuit 111c and the touch circuit 114. The receiving circuit 111a is configured to receive the video packet stream 10 from the outside and provide an external vertical sync signal Vsync1, an external horizontal sync signal Hsync1 and a first data signal to the line memory 111b according to the video packet stream 10. The line memory 111b is coupled to the receiving circuit 111a to temporarily store the first data signal. A memory space of the line memory 111b may be determined according to a design requirement. For example, the memory space of the line memory 111b may be greater than total_line_number*{1−[(RTNA*OSC_deviation)/(Hsync1_width)]}, wherein total_line_number represents that a total number of scan lines for a video frame (i.e., the number of line periods (the number of the scan lines)), RTNA represents a time length (of which the unit is microsecond (us)) of a scan line of an internal horizontal sync signal Hsync2, OSC_deviation represents a deviation rate (i.e., a drift amount, of which the unit is %) of a frequency of an internal clock signal provided by the oscillator circuit 111d, and Hsync1_width represents a time length (of which the unit is microsecond (us)) of a scan line of an external horizontal sync signal Hsync1.

According to the formula, the more the drift amount OSC_deviation of the oscillator circuit 111d speeds up, or the more the total number total_line_number of the scan lines is, the more a demand for the memory space of the line memory 111b is. For example, if it is assumed that total_line_number=1440, RTNA=11 us, Hsync1_width=11.4 us, and OSC_deviation=5%, the line memory 111b needs a memory space for 51 scan lines in a condition that the oscillator drift is not considered, but the line memory 111b needs a memory space for 120 scan lines or more in a condition that the oscillator drift speeds up by 5%.

Figure 2:
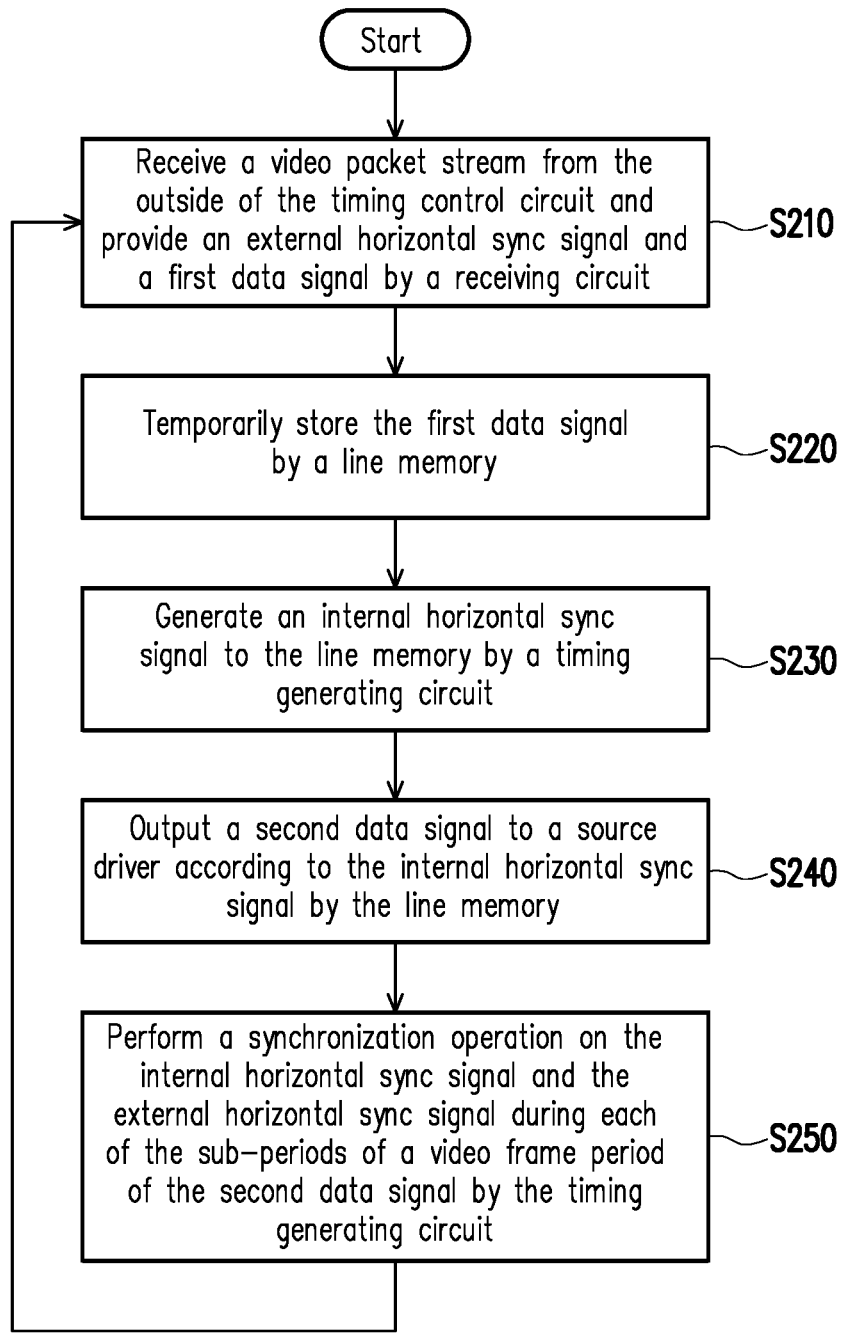
FIG. 2 is a flowchart illustrating an operation method of a timing control circuit according to an embodiment of the invention.

FIG. 2 is a flowchart illustrating an operation method of a timing control circuit 111 according to an embodiment of the invention. Referring to FIG. 1 and FIG. 2, the flowchart shown in FIG. 2 can be applied to the active long H mode and the doze mode. The following is a description of the doze mode. The timing generating circuit 111c is coupled to the receiving circuit 111a to receive the external vertical sync signal Vsync1 and the external horizontal sync signal Hsync1. In step S210, the receiving circuit 111a receives a video packet stream 10 from the outside and provides an external vertical sync signal Vsync1, an external horizontal sync signal Hsync1 and a first data signal according to the video packet stream 10. In step S220, the line memory 111b temporarily stores the first data signal.

In step S230, the timing generating circuit 111c may generate an internal vertical sync signal and the internal horizontal sync signal Hsync2 to the line memory 111b based on the internal clock signal provided by the oscillator circuit 111d. In a premise that no synchronization operation is performed, a timing of the internal horizontal sync signal Hsync2 provided by the timing generating circuit 111c is independent of (irrelevant with) a timing of the external horizontal sync signal Hsync1 provided by the receiving circuit 111a.

In step S240, the line memory 111b may output a second data signal to the source driver 112 according to the internal vertical sync signal and the internal horizontal sync signal Hsync2 provided by the timing generating circuit 111c, so as to drive at least one of the data lines (not shown) of the touch display panel 120. The second data signal refers to data which is temporarily stored in the line memory 111b. Namely, the receiving circuit 111a may write pixel data (i.e., the first data signal) into the line memory 111b according to the timing of the external horizontal sync signal Hsync1 and may read pixel data (i.e., the second data signal) from the line memory 111b according to the timing of the internal horizontal sync signal Hsync2.

Figure 3:
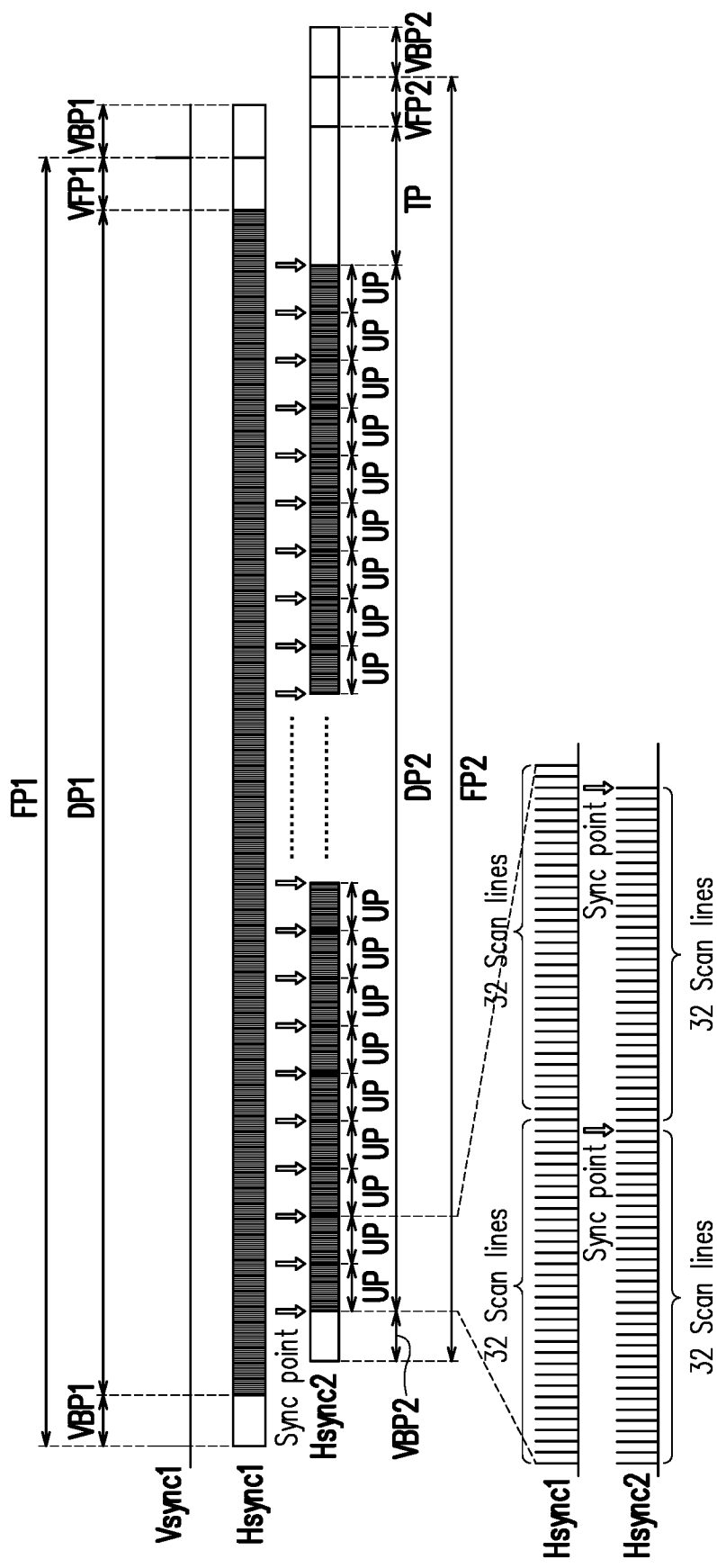
FIG. 3 is a schematic timing diagram illustrating sync points of the external horizontal sync signal Hsync1 and the internal horizontal sync signal Hsync2 depicted in FIG. 1 according to an embodiment of the invention.

FIG. 3 is a schematic timing diagram illustrating sync points of the external horizontal sync signal Hsync1 and the internal horizontal sync signal Hsync2 depicted in FIG. 1 according to an embodiment of the invention. The timing diagram shown in FIG. 3 can be applied to the doze mode. The vertical sync signal Vsync1 illustrated in FIG. 3 represents a vertical sync signal provided by the receiving circuit 111a according to the video packet stream 10. A video frame period FP1 illustrated in FIG. 3 represents a video frame period of the first data signal output by the receiving circuit 111a. The video frame period FP1 includes a vertical back porch period VBP1, a video transmission period DP1 and a vertical front porch period VFP1. The receiving circuit 111a may write the pixel data (i.e., the first data signal) into the line memory 111b according to the timing of the external horizontal sync signal Hsync1 during the video transmission period DP1 (step S220).

A video frame period FP2 illustrated in FIG. 3 represents a video frame period of the second data signal output by the line memory 111b. A video frame period FP2 of the second data signal includes a vertical back porch period VBP2, a video display operation period DP2, a touch detection period TP and a vertical front porch period VFP2. The video display operation period DP2 may be divided into a plurality of sub-periods (unit periods) UP. All the sub-periods UP in one video frame period FP2 of the second data signal are continuous. Namely, no touch sensing operation is performed during the video display operation period DP2. In step S250, the timing generating circuit 111c performs the synchronization operation for once during each of the sub-periods UP, so as to synchronize the timing of the internal horizontal sync signal Hsync2 with the timing of the external horizontal sync signal Hsync1 and the timing of the vertical sync signal Vsync1.

By being compared with the video frame period FP1, the video frame period FP2 is shortened by the video display operation period DP2, such that the touch detection period TP may be inserted. A sum of a time length of the video display operation period DP2 and a time length of the touch detection period TP is smaller than or equal to a time length of the video transmission period DP1. In a state of a doze mode, the driving circuit 110 may perform the touch sensing operation only after the video display operation of a complete frame is performed. In order to insert the touch detection period TP for performing the touch sensing operation in one video frame period FP2, the driving circuit 110 may perform the video display operation according to the internal horizontal sync signal Hsync2. A cycle of the internal horizontal sync signal Hsync2 is different from (smaller than) a cycle of the external horizontal sync signal Hsync1, such that the touch detection period may be inserted in one video frame period. For example, if it is assumed that the video transmission period DP1 includes M line periods (M scan lines), the video display operation period DP2 is divided into N sub-periods (number of the sub-periods UP in the video display operation period DP2), and the cycle of the external horizontal sync signal Hsync1 is T, the cycle t of the internal horizontal sync signal Hsync2 is {[(M/N)−p]/(M/N)}*T, wherein p is a real number. M, N, T and p set forth above may be determined according to design requirements.

For illustrative convenience, a specific example of the cycle of the internal horizontal sync signal Hsync2 and the cycle of the external horizontal sync signal Hsync1 is illustrated in the lower part of FIG. 3. In any case, in other embodiments. M, N, T and p are not limited to the example illustrated in the lower part of FIG. 3. In the example illustrated in the lower part of FIG. 3, if it is assumed that the video transmission period DP1 includes 1440 line periods (time periods of 1440 scan lines), the video display operation period DP2 is divided into 45 sub-periods, the cycle of the external horizontal sync signal Hsync1 is T, and p is 1, the cycle t of the internal horizontal sync signal Hsync2 is (31/32)*T.

The timing generating circuit 111c generates the internal horizontal sync signal Hsync2 according to the internal clock signal provided by the oscillator circuit 111d. A frequency of the internal clock signal provided by the oscillator circuit 111d may probably drift due to a temperature change, such that a frequency (cycle) of the internal horizontal sync signal Hsync2 may drift. By adding a plurality of sync points in one video display operation period DP2, the timing control circuit 111 may prevent a drift amount of the frequency (cycle) of the internal horizontal sync signal Hsync2 from being accumulated. Thus, when the frequency of the internal clock signal provided by the oscillator circuit 111d becomes faster, a reading speed at which a data signal is read from the line memory 111b may still comply with the design specification, so as to avoid the occurrence of the "(tearing effect)" issue.

In the example illustrated in the lower part of FIG. 3, a time of each of the sub-periods UP (corresponding to 32 scan lines) of the internal horizontal sync signal Hsync2 is equivalent to a time of each of 31 scan lines of the external horizontal sync signal Hsync1. Thus, by being compared with the video transmission period DP1, the video display operation period DP2 is shortened by a time of 45 scan lines of the external horizontal sync signal Hsync1, and the time of the 45 scan lines may be employed as a touch detection period TP. During the touch detection period TP, the timing generating circuit 111c may control the touch circuit 114 to drive the at least one touch sensor (not shown) of the touch display panel 120. The touch circuit 114 may drive the at least one touch sensor (not shown) of the touch display panel 120 in the doze mode during the touch detection period TP. Thus, the driving circuit 110 may drive the touch display panel 120 via the touch circuit 114, so as to sense/detect a touch event occurring to the touch display panel 120.

During the video display operation period DP2, the timing generating circuit 111c may control the source driver 112, so as to drive the at least one of the data lines (not shown) of the touch display panel 120, and the timing generating circuit 111c may further control the gate driver 113, so as to drive the at least one of the scan lines (not shown) of the touch display panel 120. Thus, the driving circuit 110 may drive the touch display panel 120 via the source driver 112 and the gate driver 113, so as to display the video frames on the touch display panel 120.

According to different design requirements, the block of the timing generating circuit 111c may be implemented in a form of hardware or firmware or a combination of the aforementioned two forms. In terms of the form of hardware, the block of the timing generating circuit 111c may be implemented as a logic circuit on an integrated circuit. Related functions of the timing generating circuit 111c may be implemented as hardware elements by using hardware description languages (e.g., Verilog HDL or VHDL) or other suitable programming languages. For example, the related functions of the timing generating circuit 111c may be implemented as various logical blocks, modules and circuits in one or more controllers, microcontrollers, microprocessors, application-specific integrated circuits (ASICs), digital signal processors (DSPs), field programmable gate arrays (FPGAs) and/or other processing units.

In terms of the form of firmware, the related functions of the timing generating circuit 111c may be implemented as programming codes. For example, the timing generating circuit 111c may be implemented by employing general programming languages (e.g., C, C++ or Assembly) or other suitable programming languages. The programming codes may be recorded/stored in recording media, which include, for example, a read only memory (ROM), a storage device and/or a random access memory (RAM). The programming codes may be read from the recording media and executed by a computer, a central processing unit (CPU), a controller, a microcontroller or a microprocessor, so as to perform the related functions. As the recording media, "non-transitory computer readable media", such as a tape, a disk, a card, a semiconductor, a programmable logic circuit, etc., may be used. In addition, the program codes may also be provided to the computer (or the CPU) through any transmission medium (e.g., a communication network or a broadcast wave). The communication network includes, for example, Internet, wired communication, wireless communication or other communication media.

In light of the foregoing, with the timing control circuit and the operation method thereof provided by the embodiments of the invention, the video display operation period of a video frame period can be divided into a plurality of sub-periods. The timing generating circuit can perform the synchronization operation (i.e., synchronize the timing of the internal horizontal sync signal with the timing of the external horizontal sync signal) for once during each of the sub-periods. By adding a plurality of sync points in a video display operation period, the timing control circuit can prevent the drift amount of the frequency of the internal horizontal sync signal from being accumulated.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A timing control circuit, comprising:
a receiving circuit, configured to receive a video packet stream from the outside and provide an external vertical sync signal, an external horizontal sync signal and a first data signal according to the video packet stream;
a line memory, coupled to the receiving circuit to temporarily store the first data signal, and configured to output a second data signal to a source driver according to an internal vertical sync signal and an internal horizontal sync signal, so as to drive at least one data line of a touch display panel, wherein a video frame period of the second data signal comprises a video display operation period and a touch detection period, and the video display operation period is divided into a plurality of sub-periods; and
a timing generating circuit, coupled to the receiving circuit to receive the external vertical sync signal and the external horizontal sync signal, and configured to generate the internal vertical sync signal and the internal horizontal sync signal to the line memory and perform a synchronization operation during each of the sub-periods, so as to synchronize a timing of the internal horizontal sync signal with a timing of the external horizontal sync signal.

2. The timing control circuit according to claim 1, wherein a video frame period of the first data signal comprises a video transmission period, and a sum of a time length of the video display operation period and a time length of the touch detection period is smaller than or equal to a time length of the video transmission period.

3. The timing control circuit according to claim 1, wherein a cycle of the internal horizontal sync signal is smaller than a cycle of the external horizontal sync signal.

4. The timing control circuit according to claim 3, wherein the video transmission period comprises M line periods, the video display operation period is divided into N sub-periods, the cycle of the external horizontal sync signal is T, the cycle of the internal horizontal sync signal is t, and the cycle t is $\{[(M/N)-p]/(M/N)\}*T$, wherein p is a real number.

5. The timing control circuit according to claim 1, wherein all the sub-periods in one video frame period of the second data signal are continuous.

6. The timing control circuit according to claim 1, wherein the timing generating circuit further controls a gate driver during the video display operation period, so as to drive at least one scan line of the touch display panel.

7. The timing control circuit according to claim 1, wherein the timing generating circuit controls a touch circuit during the touch detection period, so as to drive at least one touch sensor of the touch display panel.

8. The timing control circuit according to claim 7, wherein the touch circuit drives the at least one touch sensor in a doze mode during the touch detection period.

9. An operation method of a timing control circuit, comprising:
  receiving a video packet stream from the outside of the timing control circuit by a receiving circuit;
  providing an external vertical sync signal, an external horizontal sync signal and a first data signal according to the video packet stream by the receiving circuit;
  temporarily storing the first data signal by a line memory;
  outputting a second data signal to a source driver according to an internal vertical sync signal and an internal horizontal sync signal by the line memory, so as to drive at least one data line of a touch display panel, wherein a video frame period of the second data signal comprises a video display operation period and a touch detection period, and the video display operation period is divided into a plurality of sub-periods;
  generating the internal vertical sync signal and the internal horizontal sync signal to the line memory by a timing generating circuit; and
  performing a synchronization operation during each of the sub-periods by the timing generating circuit, so as to synchronize a timing of the internal horizontal sync signal with a timing of the external horizontal sync signal.

10. The operation method according to claim 9, wherein a video frame period of the first data signal comprises a video transmission period, and a sum of a time length of the video display operation period and a time length of the touch detection period is smaller than or equal to a time length of the video transmission period.

11. The operation method according to claim 9, wherein a cycle of the internal horizontal sync signal is smaller than a cycle of the external horizontal sync signal.

12. The operation method according to claim 11, wherein the video transmission period comprises M line periods, the video display operation period is divided into N sub-periods, the cycle of the external horizontal sync signal is T, the cycle of the internal horizontal sync signal is t, and the cycle t is $\{[(M/N)-p]/(M/N)\}*T$, wherein p is a real number.

13. The operation method according to claim 9, wherein all the sub-periods in one video frame period of the second data signal are continuous.

14. The operation method according to claim 9, further comprising:
  controlling a gate driver by the timing generating circuit during the video display operation period, so as to drive at least one scan line of the touch display panel.

15. The operation method according to claim 9, further comprising:
  controlling a touch circuit by the timing generating circuit during the touch detection period, so as to drive at least one touch sensor of the touch display panel.

16. The operation method according to claim 15, wherein the at least one touch sensor is driven in a doze mode by the touch circuit during the touch detection period.

* * * * *